US009693097B2

(12) United States Patent
Meredith et al.

(10) Patent No.: US 9,693,097 B2
(45) Date of Patent: *Jun. 27, 2017

(54) METHOD AND APPARATUS FOR MANAGING VIEWING OF MEDIA CONTENT

(71) Applicant: AT&T MOBILITY II LLC, Atlanta, GA (US)

(72) Inventors: Sheldon Kent Meredith, Roswell, GA (US); Jeremy Fix, Acworth, GA (US); Mario Kosseifi, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,366

(22) Filed: Mar. 7, 2016

(65) Prior Publication Data

US 2016/0191996 A1 Jun. 30, 2016

Related U.S. Application Data

(63) Continuation of application No. 14/011,722, filed on Aug. 27, 2013, now Pat. No. 9,313,545.

(51) Int. Cl.
*H04N 7/16* (2011.01)
*H04N 21/442* (2011.01)
(Continued)

(52) U.S. Cl.
CPC . *H04N 21/44218* (2013.01); *G06Q 20/35785* (2013.01); *H04N 21/2393* (2013.01);
(Continued)

(58) Field of Classification Search
None
See application file for complete search history.

(56) References Cited

U.S. PATENT DOCUMENTS 6,025,869 A 2/2000 Stas et al.
6,684,240 B1 1/2004 Goddard
(Continued)

FOREIGN PATENT DOCUMENTS

EP 2490151 A1 8/2012
JP 2000175117 A 6/2000
(Continued)

OTHER PUBLICATIONS

Mas, Ignacio et al., "IMS-TV: An IMS-Based Architecture for Interactive, Personalized IPTV", IEEE Communications Magazine, Nov. 2008, 156-163.

*Primary Examiner* — Jason K Lin
(74) *Attorney, Agent, or Firm* — Guntin & Gust, PLC; Jay H. Anderson

(57) ABSTRACT

A system that incorporates the subject disclosure may perform, for example, generating parental control information for each of a plurality of users according to options selected from a plurality of media program tags retrieved from a library, detecting a first user of the plurality of users according to biometric information of the first user, identifying the parental control information associated with the first user, tuning to a first media channel responsive to receiving a first request, receiving in the first media channel a first media program tag associated with a first media program, and enabling presentation of the first media program at a presentation device responsive to detecting from the parental control information associated with the first user that the first media program tag is included in a first list of unrestricted media program presentations. Other embodiments are disclosed.

20 Claims, 7 Drawing Sheets

(51) Int. Cl.
*H04N 21/454* (2011.01)
*H04N 21/4223* (2011.01)
*H04N 21/4415* (2011.01)
*H04N 21/239* (2011.01)
*H04N 21/262* (2011.01)
*H04N 21/475* (2011.01)
*G06Q 20/34* (2012.01)
*H04N 21/45* (2011.01)
*H04N 21/433* (2011.01)
*H04N 21/488* (2011.01)

(52) U.S. Cl.
CPC ... *H04N 21/26291* (2013.01); *H04N 21/4223* (2013.01); *H04N 21/4334* (2013.01); *H04N 21/4415* (2013.01); *H04N 21/454* (2013.01); *H04N 21/4532* (2013.01); *H04N 21/4542* (2013.01); *H04N 21/4751* (2013.01); *H04N 21/4755* (2013.01); *H04N 21/4756* (2013.01); *H04N 21/4882* (2013.01)

(56) References Cited

U.S. PATENT DOCUMENTS

| | | |
|---|---|---|
| 6,741,834 B1 | 5/2004 | Godwin |
| 6,922,843 B1 | 7/2005 | Herrington et al. |
| 7,131,132 B1 | 10/2006 | Gehlot et al. |
| 7,673,313 B2 | 3/2010 | Masaki |
| 7,712,118 B1 | 5/2010 | Sato |
| 8,024,753 B1 | 9/2011 | Kummer et al. |
| 8,103,244 B2 | 1/2012 | Tran et al. |
| 8,218,080 B2 | 7/2012 | Xu et al. |
| 8,312,484 B1 | 11/2012 | McCarty et al. |
| 8,347,325 B2 | 1/2013 | Price et al. |
| 2002/0166123 A1 | 11/2002 | Schrader et al. |
| 2003/0154473 A1 | 8/2003 | Shin |
| 2004/0261097 A1 | 12/2004 | Hanks |
| 2005/0081043 A1* | 4/2005 | Evans ............ H04N 7/162 713/182 |
| 2005/0097595 A1 | 5/2005 | Lipsanen et al. |
| 2005/0210145 A1 | 9/2005 | Kim et al. |
| 2006/0095543 A1 | 5/2006 | Ito et al. |
| 2006/0195864 A1 | 8/2006 | New et al. |
| 2006/0242309 A1 | 10/2006 | Damick |
| 2007/0130585 A1* | 6/2007 | Perret ............ H04N 7/17318 725/46 |
| 2007/0157220 A1 | 7/2007 | Cordray et al. |
| 2007/0256093 A1 | 11/2007 | Hiler |
| 2007/0294718 A1 | 12/2007 | Fujita |
| 2008/0120635 A1* | 5/2008 | Trimper ............ H04N 21/4126 725/25 |
| 2008/0278635 A1 | 11/2008 | Hardacker |
| 2009/0094647 A1 | 4/2009 | Inoue et al. |
| 2009/0204475 A1 | 8/2009 | Cohen et al. |
| 2009/0222849 A1 | 9/2009 | Peters |
| 2009/0232473 A1 | 9/2009 | Kendall et al. |
| 2010/0052853 A1 | 3/2010 | Hilton |
| 2010/0169931 A1 | 7/2010 | Mountain |
| 2010/0220972 A1 | 9/2010 | Bryan |
| 2011/0072452 A1* | 3/2011 | Shimy ............ H04N 7/163 725/25 |
| 2011/0154385 A1* | 6/2011 | Price ............ H04H 60/45 725/12 |
| 2011/0307397 A1* | 12/2011 | Benmbarek ............ G06Q 50/01 705/319 |
| 2012/0060176 A1* | 3/2012 | Chai ............ H04H 60/45 725/10 |
| 2012/0167123 A1* | 6/2012 | Gavita ............ H04N 21/4223 725/10 |
| 2012/0278899 A1 | 11/2012 | Mahan |
| 2013/0156398 A1 | 6/2013 | Fradet et al. |
| 2013/0174194 A1* | 7/2013 | Mooneyham ...... H04N 21/4348 725/28 |
| 2013/0205326 A1 | 8/2013 | Sinha et al. |
| 2013/0268954 A1 | 10/2013 | Hulten et al. |
| 2014/0150002 A1* | 5/2014 | Hough ............ H04N 21/4415 725/9 |
| 2014/0258863 A1* | 9/2014 | Woods ............ G06F 3/0484 715/716 |
| 2014/0331242 A1* | 11/2014 | De La Garza ... H04N 21/44218 725/12 |

FOREIGN PATENT DOCUMENTS

| | | |
|---|---|---|
| JP | 2001016514 | 1/2001 |
| JP | 2008182392 A | 8/2008 |

\* cited by examiner

100

200

METHOD AND APPARATUS FOR MANAGING VIEWING OF MEDIA CONTENT

CROSS-REFERENCE TO RELATED APPLICATIONS

This application is a continuation of U.S. application Ser. No. 14/011,722, filed Aug. 27, 2013, which is incorporated herein by reference in its entirety.

FIELD OF THE DISCLOSURE

The subject disclosure relates to a method and apparatus for managing presentation of media content and communications.

BACKGROUND

Media presentation systems such as set-top boxes today provide parental control services. However, such systems tend to be simplistic in nature and generally provide blocking of media content by standard media content ratings (e.g., G, PG-13, etc.). Given the advent of smart phones and tablets, exposure to unrestricted media content is much greater than before, which may raise concerns for parents who wish to control consumption of media content across multiple media devices of their children.

BRIEF DESCRIPTION OF THE DRAWINGS

Reference will now be made to the accompanying drawings, which are not necessarily drawn to scale, and wherein.

DETAILED DESCRIPTION

Figure 1:
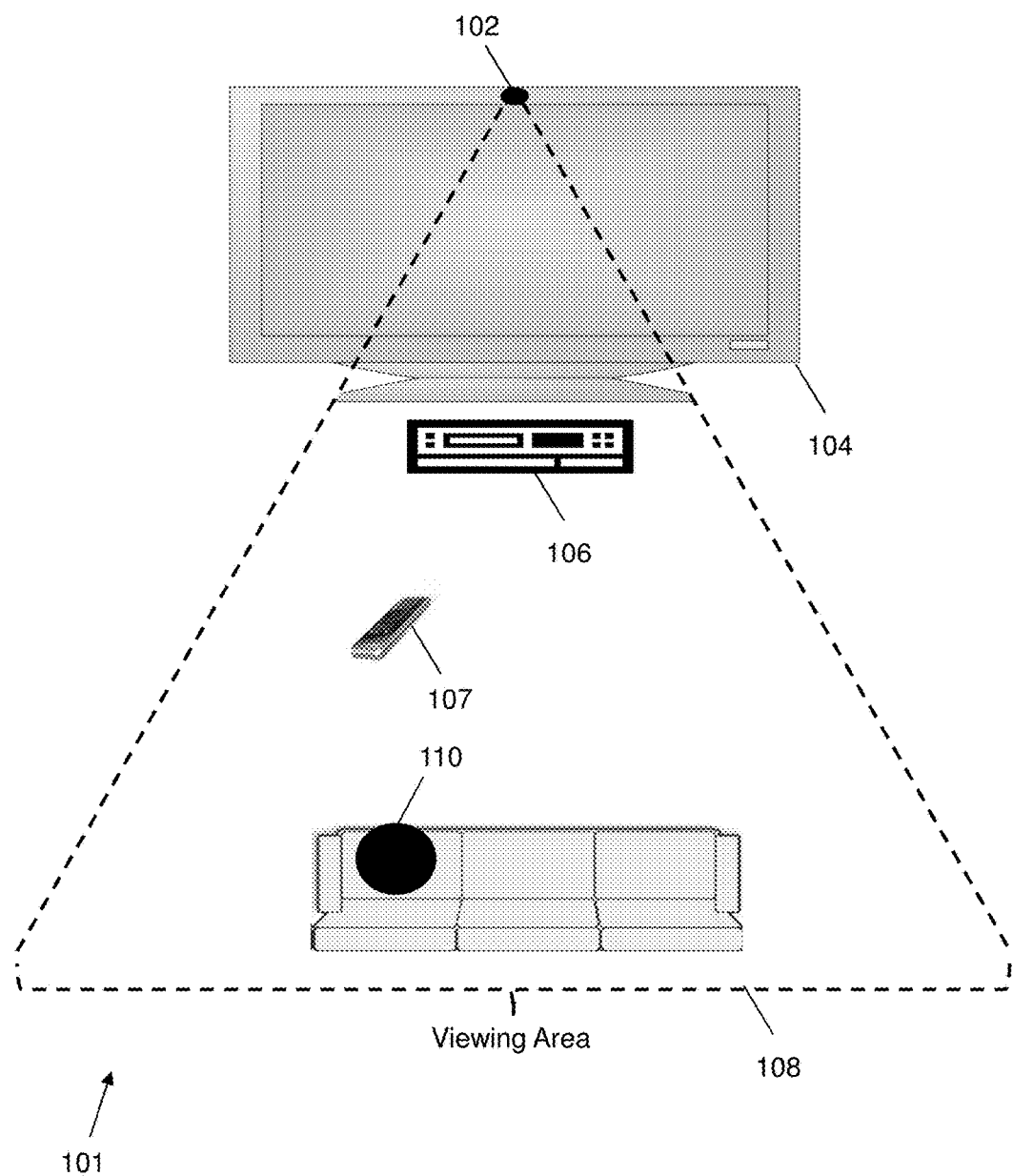
FIG. 1 depicts an illustrative embodiment of a media presentation system.

The subject disclosure describes, among other things, illustrative embodiments for generating parental control information for controlling presentation of media content and communications. Other embodiments are included in the subject disclosure.

One embodiment of the subject disclosure includes a method for receiving, by a set-top box comprising a processor, a library comprising a plurality of media program tags associated with a plurality of media programs, presenting, by the set-top box, selectable options from the plurality of media programs of the library, generating, by the set-top box, parental control information for each of a plurality of users according to options selected from the plurality of media programs of the library, receiving, by the set-top box, biometric information to identify each of the plurality of users, receiving, by the set-top box, a first request to utilize the set-top box for viewing media programs at a presentation device coupled to the set-top box, detecting, by the set-top box, a first user of the plurality of users initiating the first request according to the biometric information of the first user, identifying, by the set-top box, the parental control information associated with the first user, tuning, by the set-top box, to a first media channel responsive to receiving a second request, receiving, by the set-top box, in the first media channel a first media program tag associated with a first media program, where the first media program tag is included in the plurality of media program tags of the library, and enabling, by the set-top box, presentation of the first media program at the presentation device responsive to detecting from the parental control information associated with the first user that the first media program tag is included in a first list of unrestricted media program presentations.

One embodiment of the subject disclosure includes a computer-readable storage medium, comprising instructions which, responsive to being executed by a processor, cause the processor to perform operations comprising generating parental control information for each of a plurality of users according to options selected from a plurality of media program tags retrieved from a library, detecting a first user of the plurality of users according to biometric information of the first user, identifying the parental control information associated with the first user, tuning to a first media channel responsive to receiving a first request, receiving in the first media channel a first media program tag associated with a first media program, where the first media program tag is included in the plurality of media program tags of the library, and enabling presentation of the first media program at a presentation device responsive to detecting from the parental control information associated with the first user that the first media program tag is included in a first list of unrestricted media program presentations.

One embodiment of the subject disclosure includes a set-top box, comprising a sensor, a memory to store executable instructions, and a processor coupled to the sensor and the memory. Responsive to executing the instructions, the processor performs operations comprising generating parental control information for each of a plurality of users according to options selected from a plurality of media program tags retrieved from a library, sensing a first user of the plurality of users according to biometric information of the first user, obtaining the parental control information associated with the first user, receiving in a first media channel a first media program tag associated with a first media program, where the first media program tag is included in the plurality of media program tags of the library, and enabling presentation of the first media program at a presentation device responsive to detecting from the parental control information associated with the first user that the first media program tag is included in a first list of unrestricted media program presentations.

FIG. 1 depicts an illustrative embodiment 100 of a media presentation system 101. The presentation system 101 can comprise a presentation device 104, such as a television, which can be coupled to a media processor 106, such as a set-top box. The presentation device 104 can be coupled to an image sensor 102, such as a camera, which can be integrated with the presentation device 104 or can be placed on a top surface of the presentation device 104. The media processor 106 can be communicatively coupled to the presentation device 104 by a wired or wireless connection. The media processor 106 can be communicatively coupled to the image sensor 102 directly or by way of the presentation device 104 by a wired or wireless connection. The image sensor 102 can capture images of an individual 110 while viewing a media program and/or another individual 202 in transit in a viewing area 108 as shown in embodiment 200 of FIG. 2.

Figure 2:
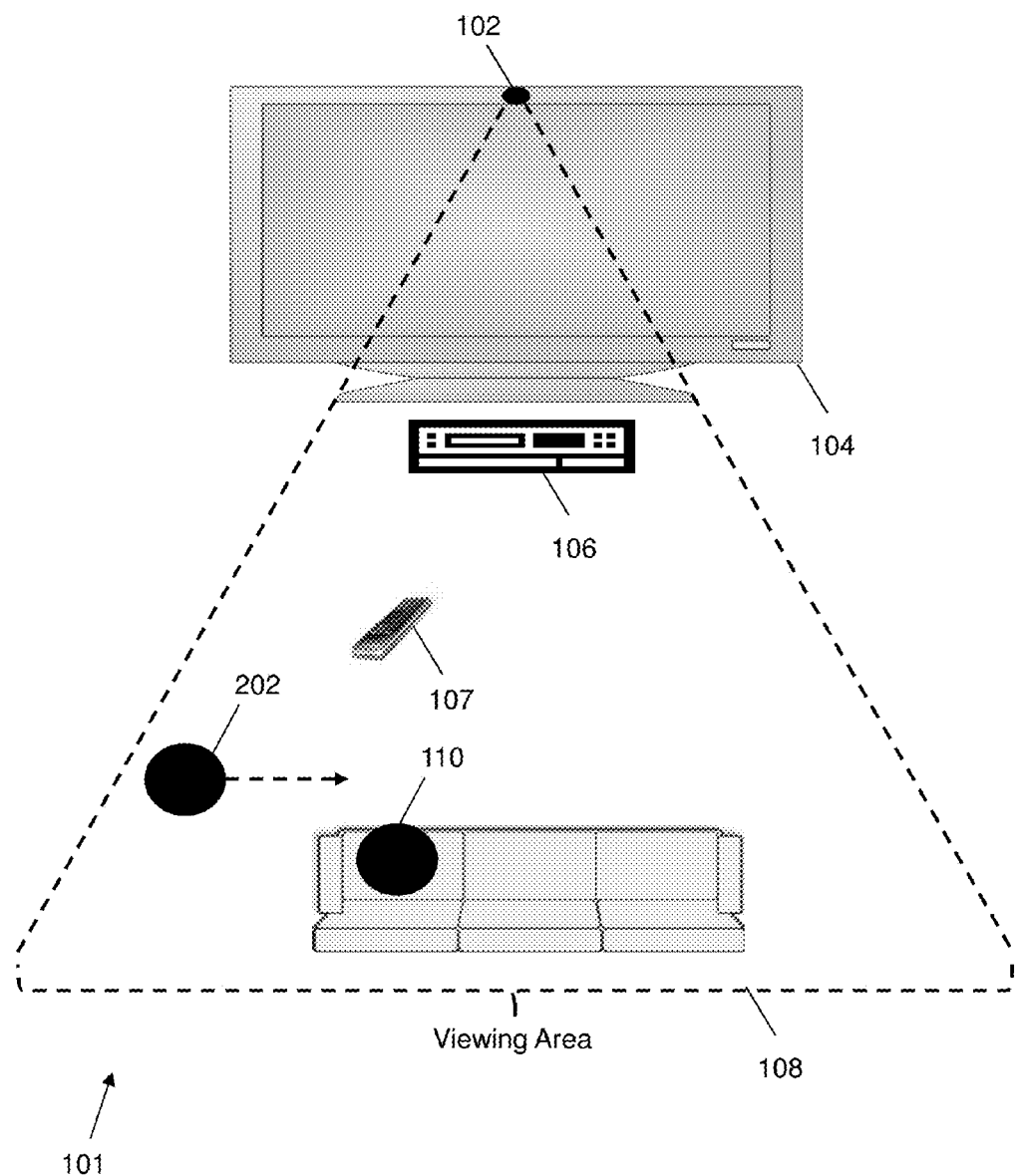
FIG. 2 depicts another illustrative embodiment of the media presentation system.
Figure 3:
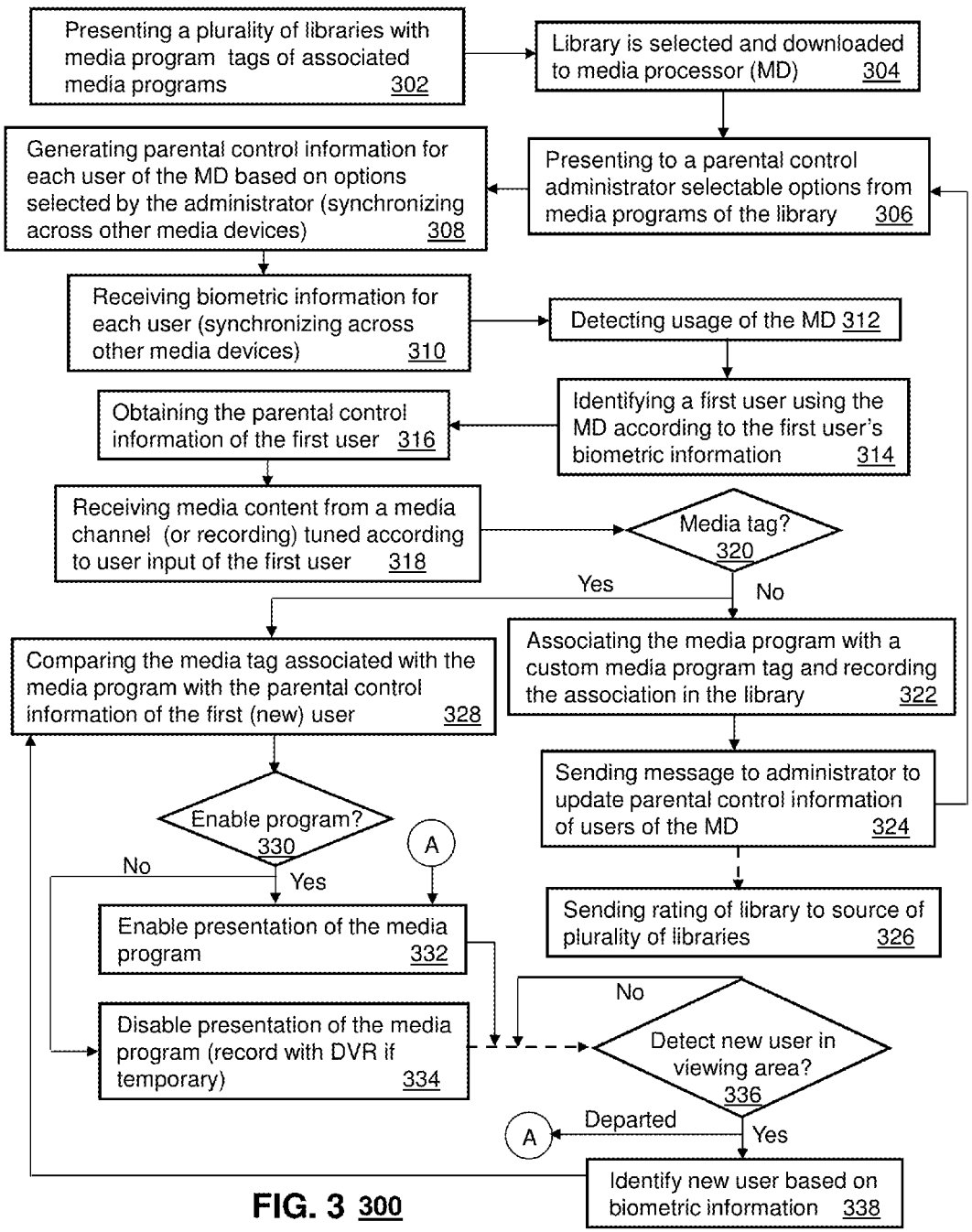
FIG. 3 depicts an illustrative embodiment of a method operating in portions of the system described in FIGS. 1-2.

FIG. 3 depicts an illustrative embodiment of a method 300 operating in portions of the presentation system 101 described in FIGS. 1-2. Method 300 can begin with step 302 in which the media processor 106 causes a presentation via the presentation device 104 of a plurality of libraries with media program tags associated with media programs. Media programs can represent moving images (such as video), still images, audio, or combinations thereof. In one embodiment, media program tags can represent an identifier which is associated with a media program presented by a particular media channel. A media channel can represent a tunable channel of a media system, which provides a diverse set of media programs on a per channel basis. In one embodiment, a media program tag association with a media program can vary according to a geographic region, by media channel, and/or by service provider.

For example, a media program (such as Falling Skies) presented in Illinois may have a media program tag associated with the media program that differs from the media program tag used in Georgia for the same media program. Similarly, a media program tag associated with a media program supplied by a first service provider of media program services may differ from the media program tag associated with the same media program supplied by a second service provider of media program services. Additionally, more than one media program tag may be associated with the same media program to distinguish between media channels. For example, media channel 3 and media channel 4 may present the same media program at different times. The media program tag associated with the media program of media channel 3 may differ from the media program tag associated with the same media program of media channel 4.

Libraries of media program tags and their associated media programs and media channels can be used to track the differences between regions, media channels and service providers. Each library may be generated by a different vendor and sold for consideration to subscribers of different service providers. Media program tags can be embedded with media programs as metadata or other forms of embedded control information, which a media processor 106 can retrieve from the media program. The media program tag can be transmitted periodically at different points in time in the media program so that a media processor 106 can retrieve the media program tag in instances when a subscriber tunes to the media program after a scheduled start time.

The libraries presented in step 302 can be presented by vendor with information descriptive of the regions and service providers, which may be applicable to the subscriber for any particular library. More than one vendor may compete for the sale of a library covering the same region and the same service provider. To assist a subscriber in selecting a library vendor, the libraries may be rated according to a social network of subscribers who submit their opinion as to the efficacy and accuracy of any particular library of a vendor.

The libraries can be presented in a graphical user interface presented at the presentation device 104 with selectable options which a subscriber can select with navigation buttons of a remote control device 107 (e.g., a set-top box remote controller, a tablet, a cell phone, etc.) that can wirelessly interface to the media processor 106 using infrared or radio frequency technology. Once a subscriber selects a library, or in some instances purchases the library, the library is downloaded in step 304 to the media processor 106. At step 306, the media processor 106 presents a graphical user interface with selectable options of media programs that can be organized into restricted and unrestricted lists assignable to users managed by the parental control administrator. For instance, the media processor 106 can present a listing of media programs by genre, in alphabetical order, or other suitable presentation schemes. Each media program can be presented by name (e.g., Falling Skies, Seinfeld, etc.), the media channels that present the media program, the presentation schedules of the media program, a parental rating based on industry standards (e.g., G, PG, PG-13, etc.), a parental ratings based on social networks, and so on.

The parental control administrator can create from the graphical user interface restricted and unrestricted lists of the media programs on a per user basis. The restricted list represents media programs that are not to be presented to a select user. Media programs in the restricted list may be restricted temporarily or indefinitely. For instance, a select media program may have a restricted viewing during a time of day (e.g., 8 pm-10 pm), and would be otherwise unrestricted at other times. In other instances, a media program may be restricted at all times. Similar rules can apply to media programs in the unrestricted list. For example, a media program may have an unrestricted viewing during a time of day (e.g., 8 pm-10 pm), and would be otherwise restricted at other times. In other instances, a media program may be unrestricted at all times. As noted earlier, a media program may be shown in more than one media channel and the media program tags associated with the media program may differ between media channels. In such instances, the restricted and unrestricted lists may contain multiple media program tags to manage viewing of the same media program between media channels.

Once the parental control administrator has created in step 306 restricted and unrestricted media program lists with temporal data describing viewing or restricted viewing times for each user of the media processor 106 using the navigation keys of the remote controller 107, the media processor 106 in step 308 can generate parental control information for each user. For users with multiple media devices (e.g., a tablet, a computer, a smart phone, etc.) the parental control information can be supplied by the media processor 106 to these media devices to maintain a synchronized parental control environment per user. At step 310, biometric information can be collected for each user. Biometric information can include facial recognition data, body recognition data, finger print data, or other forms of recognition data suitable for identifying individuals.

The biometric information can be collected by the image sensor 102 and/or by other biometric devices (e.g., fingerprint reader) accessible by the media processor 106. The biometric information can be collected by the media processor 106 by requesting individuals to provide biometric information in a calibration session, or by passively collecting biometric information as the users of the media processor 106 utilize its services. The biometric information can be included in the parental control information generated in step 308 or can be stored separately. For synchronization purposes, the biometric information collected from the individuals who utilize the media processor 106 can also be shared with media devices of the users to maintain a synchronous environment as will be described shortly.

Once the parental control information and biometric information have been collected by the media processor 106, and media devices of the users of the media processor 106, the media processor 106 can invoke parental controls as have been defined by the parental control administrator in step 308. For instance, when the media processor 106 detects usage by a user (e.g., powering on the media processor 106 by way of the remote control device 107), the media processor 106 can collect image data from the image sensor 102 to identify in step 314 a first user according to the user's biometric information. At step 316, the media processor can obtain the parental control information of the first user by matching the first user's identity to his/her parental control information. At step 318, the media processor 106 can receive a tuning request by way of the remote control device 107 to tune to a particular media channel, and thereby begin receiving media content from the selected media channel at step 318.

The media content can include media programs and ancillary content such as advertisements. Upon receiving a media program, the media processor 106 can extract the media program tag (if there is one) that came with the media program at the start of the media program or during a subsequent period (e.g., every 500 ms). If the service provider does not provide a media program tag with the media program, or the media program tag that came with the media program is unrecognized, the media processor 106 can proceed to step 322. In a case where the media program is missing a media program tag, at step 322 the media processor 106 can associate the media program with a custom media program tag which may be self generated by the media processor 106 or selected from a list of unused custom media program tags stored in the media processor 106. Each custom media program tag is unique so that it can be used exclusively to identify a specific media program presented by a specific media channel. In a case where the media processor 106 detects at step 322 that the media program has an unrecognized media program tag, the media processor 106 can utilize the unrecognized media program tag and record it in a list of unrecognized media program tags with the associated media program and media channel.

Once a custom media program tag is associated with a specific media program and media channel, or the media processor 106 utilizes an unrecognized media program tag, the media processor 106 can submit a message to the parental control administrator requesting that the parental control administrator update the parental control information for users of the media processor 106 according to the media program detected in step 320. Since in this illustration there is only one instance of a media program that has not been associated with a restricted or unrestricted list of the users being managed by the parental control administrator, it would be relatively simple for the parental control administrator to perform such assignments in step 306. For instance, the media processor 106 can present a graphic user interface whereby the parental control administrator may drag and drop the unassigned media program to restricted and unrestricted lists of the user's being managed by the parental control administrator. In instances where the parental control administrator wishes to define a temporal range for restricted and restricted viewings of the media program, the media processor 106 can present an additional graphical user interface to define such viewing times.

To assist the parental control administrator in instances where the media program is unfamiliar to the parental control administrator, the media processor 106 can record in whole or in part a copy of the unassigned media program detected in step 320 in a digital video recorder (DVR) of the media processor 106 or in a DVR coupled thereto. The parental control administrator can view from the DVR the media program in whole or in part and decide whether to restrict or unrestrict viewing of the media program on a per user basis at step 306.

The media processor 106 can maintain a list of media programs detected in step 320 with a missing media program tag, as well as a list of media programs detected with an unrecognized media program tags. In the latter list, the media processor 106 can count the number of instances an unrecognized media program tag is detected. This information can be presented to the parental control administrator. The parental control administrator can use this information to issue in step 326 a rating of the library to a provider of the libraries. The rating can be a number of stars, a numeric rating, or other suitable rating metric. The rating can be combined or averaged with other ratings collected from subscribers to enable the provider of the libraries to provide an aggregate rating score for each vendor library, which is viewable to future subscribers considering to use libraries from different vendors.

Referring back to step 320, if the media program received in step 318 contains a media program tag recognized by the media processor 106, then the media processor 106 can proceed to step 328 where it compares the received media program tag with the parental control information of the first user identified at step 314. If the media program tag is found in an unrestricted media program list, then at step 332 the media processor 106 enables presentation of the media program if the unrestricted viewing is for all times or for a given temporal range that coincides with the viewing time chosen by the first user. It should be noted that step 318 can be the result of the first user wanting to view a recording of the media program stored in the DVR. In such instances, the media processor 106 will enable presentation of the media program at step 332 if the viewing is unrestricted for all times or coincident with a given time specified in the parental control information. If, however, the media program tag is in a restricted viewing list, which indicates an unlimited restricted viewing period, or the viewing is restricted for a given period which is coincident with the time chosen by the first user, then the media processor 106 proceeds to step 334 and disables a presentation of the media program.

In the prior instance where presentation of the media program is enabled at step 332, the media processor 106 at step 336 can also monitor the viewing area 108 to determine if other users enter the viewing area of the presentation device 104. If a user is detected, such as a user 202, in transit through the viewing area 108, the user can be identified in step 338 according to the biometric information of the user (e.g., facial and/or body features). At step 328 the media processor 106 can compare the parental control information obtained for user 202 to the media program tag of the media program being presented. If the media program tag is found in the restricted viewing list, which indicates an unlimited restricted viewing of the media program, or the viewing is restricted for a given period which is coincident with the time the user 202 enters the viewing area 108, then the media processor 106 proceeds to step 334, and temporarily disables the presentation of the media program, and simultaneously enables recording of the media program by way of the DVR.

The presentation can be disabled by darkening the media program, or presenting a message indicating user 202 must depart from the viewing area to re-enable presentation of the media program. Once the media processor 106 detects at step 336 that user 202 has departed from the viewing area 108, the media processor 106 proceeds to step 332 and resumes presentation of the media program from the DVR at the departure point when the presentation was disabled at step 334.

Figure 4:
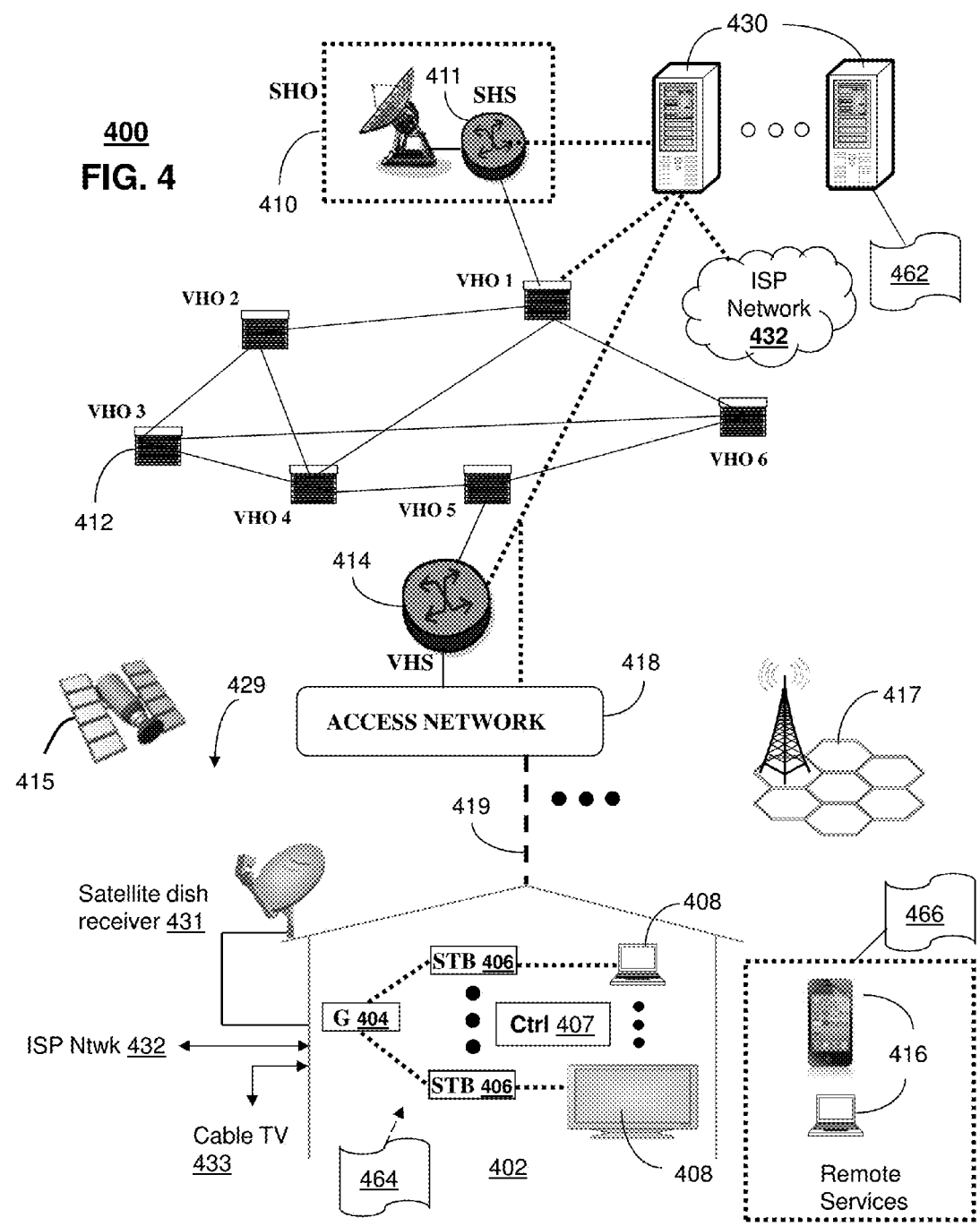
FIGS. 4-5 depict illustrative embodiments of communication systems that can be embodied or operably coupled to the media presentation systems of FIGS. 1-2.

FIG. 4 depicts an illustrative embodiment of a first communication system 400 for delivering media content. The communication system 400 can represent an Internet Protocol Television (IPTV) media system. Communication system 400 can be overlaid or operably coupled with the system of FIGS. 1-2 as another representative embodiment of communication system 400. In this embodiment, method 300 described above can be applied in whole or in part to the first communication system 400.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server (herein referred to as server 430). The server 430 can use computing and communication technology to perform function 462, which can include among other things, the steps of method 300 for managing parental controls remotely from building 102. The media processors 406 and wireless communication devices 416 can be provisioned with software functions 464 and 466, respectively, to utilize the services of server 430. Additionally, software functions 464 and 466 can be used to maintain synchronicity of parental control information between media devices of users of communication system 400 as described in method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
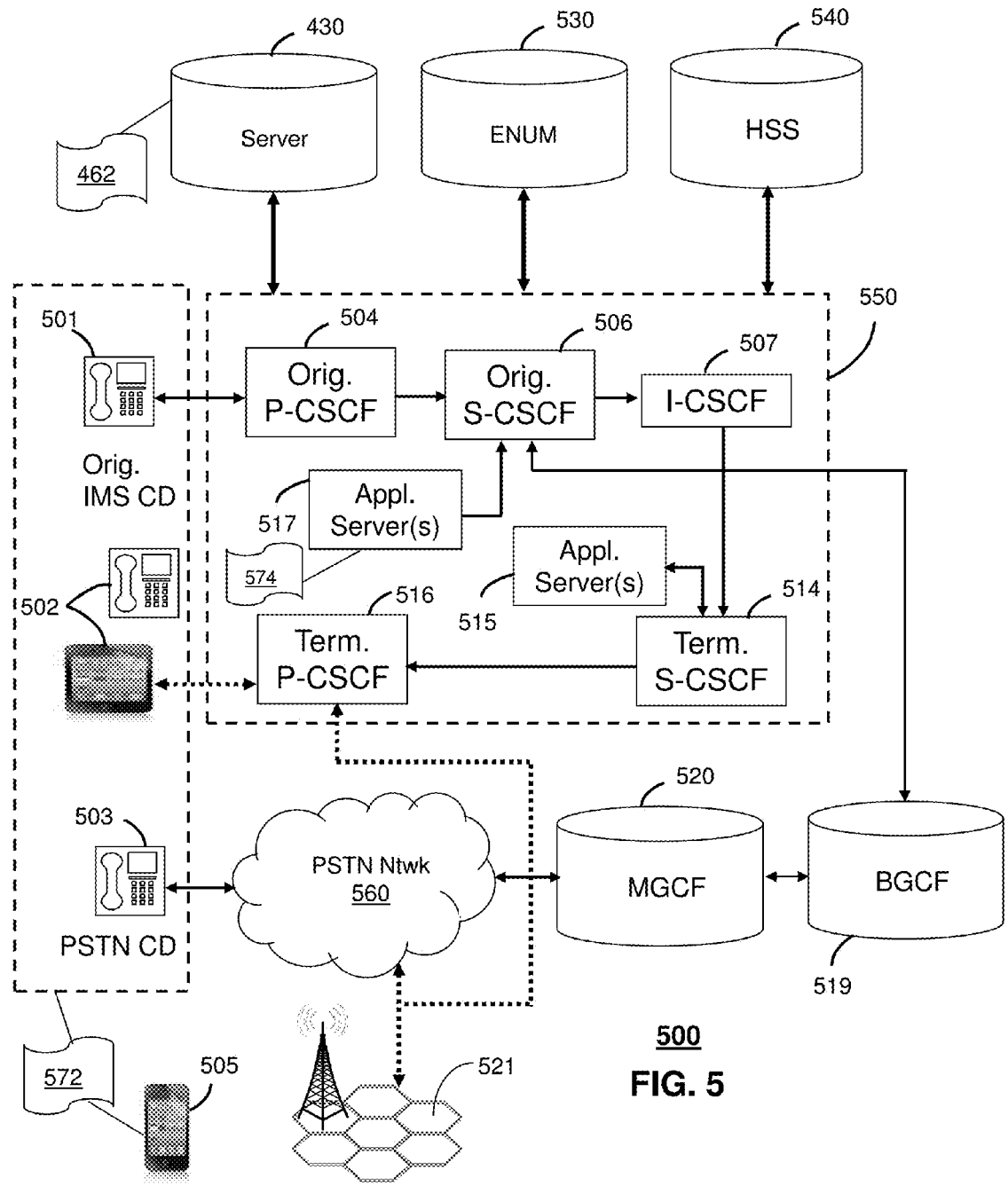

FIG. 5 depicts an illustrative embodiment of a communication system 500 employing an Internet Protocol Multimedia Subsystem (IMS) network architecture to facilitate the combined services of circuit-switched and packet-switched systems. Communication system 500 can be overlaid or operably coupled with the systems of FIGS. 1-2 and communication system 400 as another representative embodiment of communication system 400. Communication system 500 can be adapted to perform method 300 in a centralized of distributed environment.

With this in mind, communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. Server 430 can perform function 462 and thereby provide parental control services to the CDs 501, 502, 503 and 505 of FIG. 5. CDs 501, 502, 503 and 505, which can be adapted with software to perform function 572 to utilize the services of the server 430. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
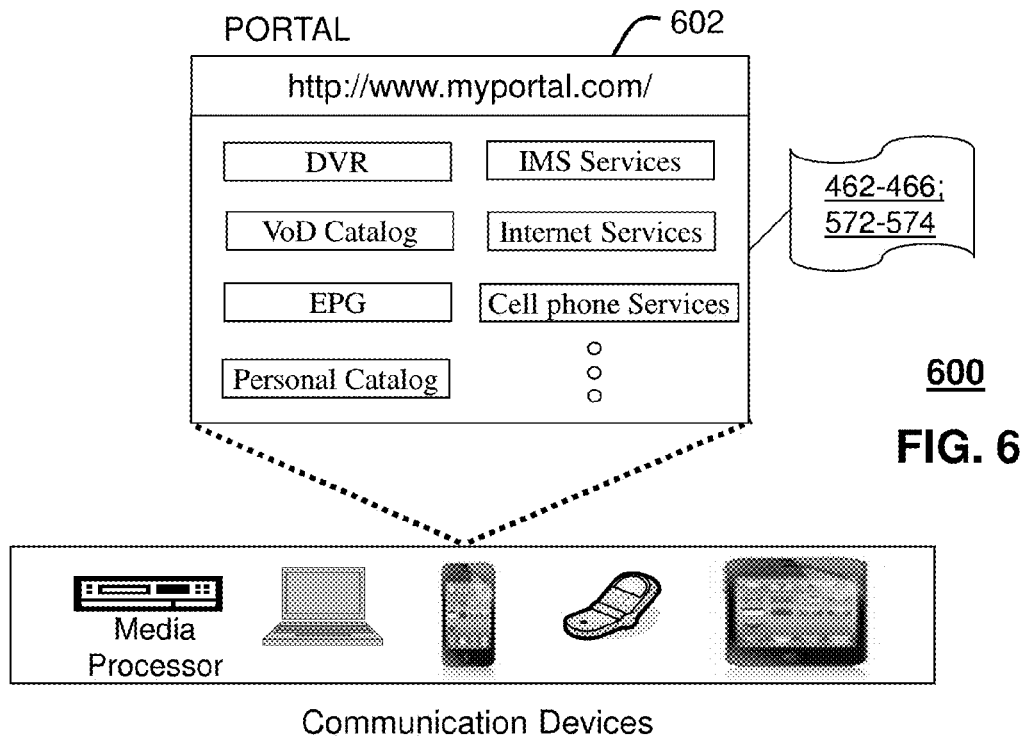
FIG. 6 depicts an illustrative embodiment of a web portal for interacting with the communication systems of FIGS. 1-2 and 4-5

FIG. 6 depicts an illustrative embodiment of a web portal 602 which can be hosted by server applications operating from the computing devices 430 of the communication system 100 illustrated in FIG. 1. Communication system 600 can be overlaid or operably coupled with system 200, communication 400, and/or communication system 500 as another representative embodiment of the systems of FIGS.

1-2, communication 400, and/or communication system 500. The web portal 602 can be used for managing services of communication systems 400-500 including parental control services as described in method 300. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2, 4 and 5. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and service providers of communication systems 400-500.

Figure 7:
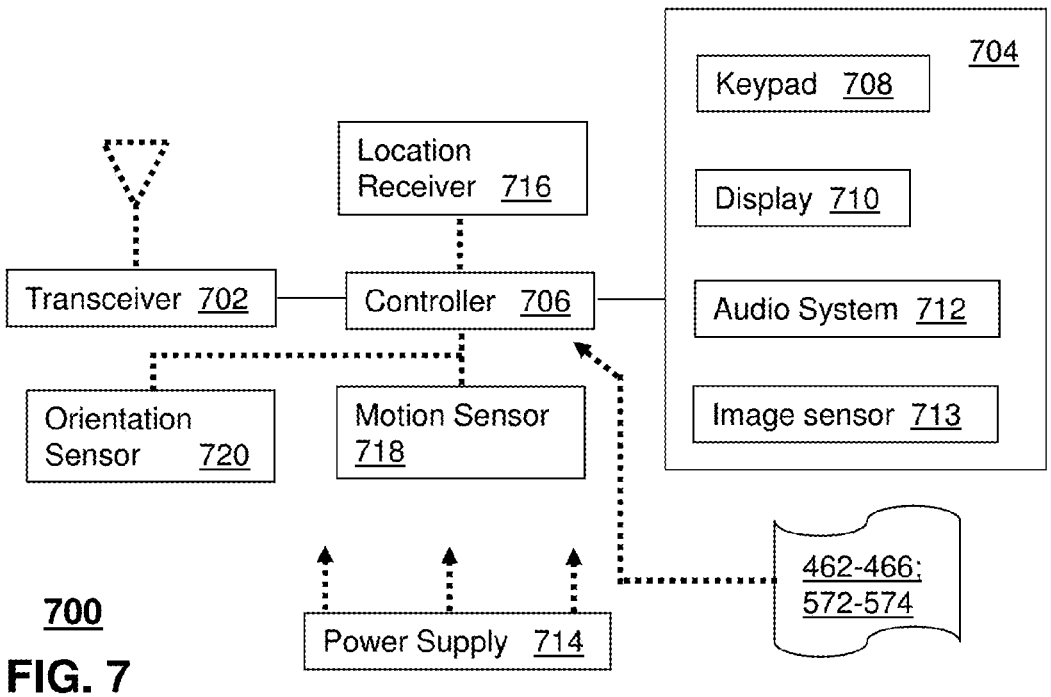
FIG. 7 depicts an illustrative embodiment of a communication device that can be representative of devices in FIGS. 1-2 and FIGS. 4-5.

FIG. 7 depicts an illustrative embodiment of a communication device 700. Communication device 700 can serve in whole or in part as an illustrative embodiment of the devices depicted in FIGS. 1-2, and 4-5. One or more instances of the communication device 700 be adapted to perform the functions described by method 300.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of the systems of FIGS. 1-2, communication system 400, and communication system 500. In addition, the controller 706 can be adapted in various embodiments to perform the functions 462-464 and 572-574, respectively.

Upon reviewing the aforementioned embodiments, it would be evident to an artisan with ordinary skill in the art that said embodiments can be modified, reduced, or enhanced without departing from the scope of the claims described below. For example, method 300 can be adapted to be performed by a backend server that manages parental controls of media devices remotely. Method 300 can also be adapted to provide parental controls for audio-only content (e.g., music, internet radio, and so on), which can be tagged and managed as described in FIG. 3. Method 300 can also be adapted to control communications between users such as texting and email. For instance, friends or acquaintances of the users being managed by the parental control administrator can be tagged, and restricted and unrestricted lists can be created to manage text and email communications between the tagged parties and the users being managed by the parental control administrator. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
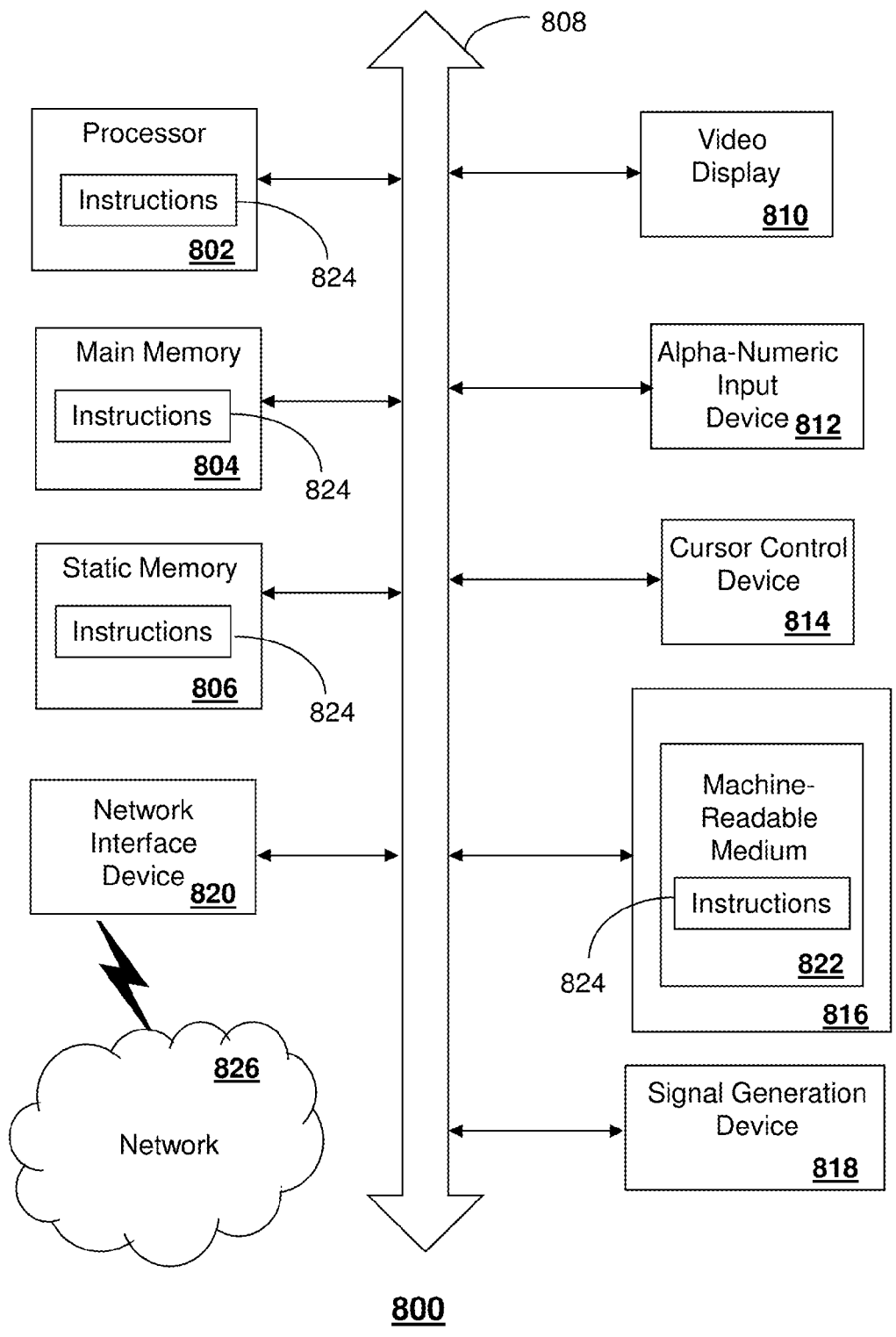
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the server 430, media processor 106 or 406, the presentation device 104, image sensor 102, and other devices of FIGS. 1-2, and 4-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a processing system including a processor; and
a memory that stores executable instructions that, when executed by the processing system, facilitate performance of operations comprising:
receiving a library comprising a plurality of media programs associated with a plurality of media program tags;
detecting, for each of the plurality of media programs, whether the associated media program tag is unrecognized;
determining a rating for the library based on a number of instances an unrecognized media program tag is detected;
monitoring a viewing area associated with a presentation device that presents a media program of the plurality of media programs;
detecting a first user in the viewing area responsive to the monitoring, the first user being associated with first parental control information;
enabling presentation of the media program at the presentation device responsive to a request from the first user and responsive to determining from the first parental control information that the media program is included in a first list of unrestricted media program presentations;
detecting that a second user has entered the viewing area, the second user being associated with second parental control information;
disabling presentation of the media program at the presentation device responsive to determining from the second parental control information that the media program is included in a second list of restricted media program presentations; and
re-enabling presentation of the media program responsive to detecting that the second user has departed the viewing area.

2. The device of claim 1, wherein the operations further comprise enabling recording of the media program responsive to the disabling of the presentation.

3. The device of claim 1, wherein the media program comprises a video image, and wherein the disabling further comprises darkening the video image.

4. The device of claim 1, wherein the disabling further comprises presenting a message via the presentation device.

5. The device of claim 4, wherein the message includes an identifier of the second user and an instruction to depart the viewing area.

6. The device of claim 1, wherein the operations further comprise:
   comparing the media program tag associated with the media program with the first parental control information to determine that the media program is included in the first list; and
   comparing the media program tag associated with the media program with the second parental control information to determine that the media program is included in the second list.

7. The device of claim 1, wherein the operations further comprise presenting information related to a plurality of libraries of media program tags associated with media programs.

8. The device of claim 7, wherein each of the plurality of libraries comprises an aggregate rating determined from feedback via a social network of users.

9. The device of claim 1, wherein the device comprises a media processor communicating with a content provider system over a network, and wherein the plurality of media programs and associated media program tags is received from the content provider system.

10. The device of claim 1, wherein the second parental control information specifies a period of time, and wherein the disabling is performed responsive to determining that the second user is in the viewing area during the specified period.

11. The device of claim 1, wherein the operations further comprise receiving biometric information to identify the first user and the second user.

12. A method comprising:
   receiving, by a processing system including a processor, a library comprising a plurality of media programs associated with a plurality of media program tags;
   detecting, by the processing system, for each of the plurality of media programs whether the associated media program tag is unrecognized;
   determining, by the processing system, a rating for the library based on a number of instances an unrecognized media program tag is detected;
   monitoring, by the processing system, a viewing area associated with a presentation device that presents a media program of the plurality of media programs;
   detecting, by the processing system, a first user in the viewing area responsive to the monitoring, the first user being associated with first parental control information;
   enabling, by the processing system, presentation of the media program at the presentation device responsive to determining from the first parental control information that the media program is included in a first list of unrestricted media program presentations;
   detecting, by the processing system, that a second user has entered the viewing area, the second user being associated with second parental control information;
   disabling, by the processing system, presentation of the media program at the presentation device to prevent viewing of the media program, responsive to determining from the second parental control information that the media program is included in a second list of restricted media program presentations;
   enabling, by the processing system, recording of the media program responsive to the disabling; and
   re-enabling, by the processing system, presentation of the media program responsive to detecting that the second user has departed the viewing area.

13. The method of claim 12, wherein the media program comprises a video image, and wherein the disabling further comprises darkening the video image, presenting a message via the presentation device, or a combination thereof.

14. The method of claim 12, wherein the media program is associated with a media program tag, and further comprising:
   comparing, by the processing system, the media program tag with the first parental control information to determine that the media program is included in the first list; and
   comparing, by the processing system, the media program tag with the second parental control information to determine that the media program is included in the second list.

15. The method of claim 14, further comprising presenting, by the processing system, information related to a plurality of libraries of media program tags associated with media programs.

16. The method of claim 12, further comprising receiving, by the processing system, biometric information to identify the first user and the second user.

17. A non-transitory machine-readable storage medium, comprising executable instructions that, when executed by a processing system including a processor, facilitate performance of operations comprising:
   receiving a library comprising a plurality of media programs associated with a plurality of media program tags;
   detecting, for each of the plurality of media programs, whether the associated media program tag is unrecognized;
   determining a rating for the library based on a number of instances an unrecognized media program tag is detected;
   monitoring a viewing area associated with a presentation device that presents a media program of the plurality of media programs;
   detecting a first user in the viewing area responsive to the monitoring, the first user being associated with first parental control information;
   enabling presentation of the media program at the presentation device responsive to determining from the first parental control information that the media program is included in a first list of unrestricted media program presentations;
   detecting that a second user has entered the viewing area, the second user being associated with second parental control information;
   disabling presentation of the media program at the presentation device responsive to determining from the second parental control information that the media program is included in a second list of restricted media program presentations;
   enabling recording of the media program responsive to the disabling of the presentation; and
   re-enabling presentation of the media program responsive to detecting that the second user has departed the viewing area.

18. The non-transitory machine-readable storage medium of claim 17, wherein the media program comprises a video image, and wherein the disabling further comprises darkening the video image, presenting a message via the presentation device, or a combination thereof.

19. The non-transitory machine-readable storage medium of claim 17, wherein the media program is associated with a media program tag, and wherein the operations further comprise:
- comparing the media program tag with the first parental control information to determine that the media program is included in the first list; and
- comparing the media program tag with the second parental control information to determine that the media program is included in the second list.

20. The non-transitory machine-readable storage medium of claim 19, wherein the operations further comprise presenting information related to a plurality of libraries of media program tags associated with media programs, and wherein each of the plurality of libraries comprises an aggregate rating determined from feedback via a social network of users.

* * * * *